United States Patent
Hiralal et al.

(10) Patent No.: US 9,786,444 B2
(45) Date of Patent: Oct. 10, 2017

(54) NANO-STRUCTURED FLEXIBLE ELECTRODES, AND ENERGY STORAGE DEVICES USING THE SAME

(75) Inventors: Pritesh Hiralal, Cambridge (GB); Husnu Emrah Unalan, Ankara (TR); Haolan Wang, Cambridge (GB); Gehan Amaratunga, Cambridge (GB); Di Wei, Cambridge (GB); Markku Antti Kyosti Rouvala, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 382 days.

(21) Appl. No.: 12/459,086

(22) Filed: Jun. 25, 2009

(65) Prior Publication Data

US 2010/0328845 A1    Dec. 30, 2010

(51) Int. Cl.
*H01G 11/36*    (2013.01)

(52) U.S. Cl.
CPC ............. *H01G 11/36* (2013.01); *Y02E 60/13* (2013.01)

(58) Field of Classification Search
CPC ........ H01G 9/058; H01G 11/36; H01G 11/26; Y02E 60/13
USPC ......................................................... 361/502
See application file for complete search history.

(56) References Cited

U.S. PATENT DOCUMENTS

| | | | |
|---|---|---|---|
| 5,882,721 A | 3/1999 | Delnick | |
| 6,759,305 B2 | 7/2004 | Lee et al. | |
| 7,060,241 B2 * | 6/2006 | Glatkowski | 423/447.1 |
| 7,261,852 B2 * | 8/2007 | Rinzler et al. | 264/317 |
| 7,573,186 B2 * | 8/2009 | Shigematsu et al. | 313/309 |
| 8,021,747 B2 * | 9/2011 | Yi et al. | 428/304.4 |
| 8,057,901 B2 * | 11/2011 | Ford et al. | 428/408 |
| 8,138,568 B2 * | 3/2012 | Yoon et al. | 257/461 |
| 8,277,691 B2 * | 10/2012 | Lu | 252/511 |
| 2002/0127474 A1 * | 9/2002 | Fleischer et al. | 429/309 |
| 2004/0131774 A1 | 7/2004 | Kellar et al. | |
| 2004/0197546 A1 | 10/2004 | Rinzler et al. | |
| 2006/0219289 A1 | 10/2006 | Skryabin et al. | |
| 2006/0291142 A1 | 12/2006 | Grigorian et al. | |
| 2007/0027029 A1 * | 2/2007 | Kasuya et al. | 502/180 |

(Continued)

FOREIGN PATENT DOCUMENTS

| | | |
|---|---|---|
| CN | 101370734 A | 2/2009 |
| EP | 0875950 A2 | 11/1998 |

(Continued)

OTHER PUBLICATIONS

Chen et al., Flexible and transparent supercapacitor based on In2O3 nanowire/carbon nanotube heterogeneous films, Jan. 28, 2009, Applied Physics Letters 94, 043113 (2009).*

(Continued)

*Primary Examiner* — David M Sinclair
(74) *Attorney, Agent, or Firm* — Alston & Bird LLP

(57) ABSTRACT

An electrical energy storage device structure comprises a first conductive sheet, a second conductive sheet and an electrolyte sheet placed between the first conductive sheet and the second conductive sheet. In the device, at least one of the first conductive sheet and the second conductive sheet comprises a layer of carbon nanoparticles. The carbon nanoparticle layer is arranged to be adjacent to the electrolyte sheet. The carbon nanoparticles may include both high aspect ratio carbon nanoparticles and low aspect ratio carbon nanoparticles. The device is flexible and at least partially transparent.

13 Claims, 4 Drawing Sheets

(56) References Cited

U.S. PATENT DOCUMENTS

| | | | |
|---|---|---|---|
| 2007/0109723 A1 | 5/2007 | Kuriyama et al. | |
| 2007/0146862 A1* | 6/2007 | Moore et al. | 359/245 |
| 2008/0010796 A1 | 1/2008 | Pan et al. | |
| 2008/0170982 A1 | 7/2008 | Zhang et al. | |
| 2008/0185936 A1* | 8/2008 | Panchapakesan et al. | 310/306 |
| 2008/0204970 A1 | 8/2008 | Ocola et al. | |
| 2008/0264482 A1 | 10/2008 | Lee et al. | |
| 2008/0299374 A1 | 12/2008 | Choi et al. | |
| 2009/0035555 A1* | 2/2009 | Brahim et al. | 428/328 |
| 2009/0039901 A1* | 2/2009 | Delatte et al. | 324/664 |
| 2009/0081880 A1 | 3/2009 | Yoshie | |
| 2009/0220407 A1* | 9/2009 | Echegoyen et al. | 423/445 B |
| 2009/0226704 A1 | 9/2009 | Kauppinen et al. | |
| 2009/0263723 A9* | 10/2009 | Zaghig et al. | 429/303 |
| 2010/0000965 A1 | 1/2010 | Kamata et al. | |
| 2010/0178568 A1* | 7/2010 | Unalan et al. | 429/317 |
| 2010/0206504 A1* | 8/2010 | Akiyama et al. | 162/181.9 |
| 2010/0284125 A1 | 11/2010 | Moon et al. | |
| 2011/0223480 A1* | 9/2011 | Wee et al. | 429/218.1 |

FOREIGN PATENT DOCUMENTS

| | | | |
|---|---|---|---|
| EP | 1473274 A1 * | 11/2004 | |
| JP | 10-334877 A | 12/1998 | |
| JP | 2000-028881 | 1/2000 | |
| JP | 2003-168745 | 6/2003 | |
| JP | 2005-39295 A | 2/2005 | |
| JP | 2005-175120 | 6/2005 | |
| JP | 2006-237357 A | 9/2006 | |
| JP | 2007-142034 A | 6/2007 | |
| JP | 2007-214107 | 8/2007 | |
| JP | 2007-242386 | 9/2007 | |
| JP | 2007-266548 | 10/2007 | |
| JP | 2007-324369 | 12/2007 | |
| JP | 2008-103687 | 5/2008 | |
| JP | 2008-135258 | 6/2008 | |
| JP | 2008-522410 A | 6/2008 | |
| JP | 2008-523234 | 7/2008 | |
| JP | 2008-523254 A | 7/2008 | |
| JP | 2008-222545 A | 9/2008 | |
| JP | 2008-251271 A | 10/2008 | |
| JP | 2009-081290 | 4/2009 | |
| JP | 2009-170007 A | 7/2009 | |
| WO | WO 2007057501 A1 * | 5/2007 | |
| WO | WO 2009054415 A1 * | 4/2009 | |
| WO | WO 2009056686 A1 * | 5/2009 | |
| WO | 2010028162 | 3/2010 | |

OTHER PUBLICATIONS

Zhou et al., A method of printing carbon nanotube thin films, Mar. 22, 2006, Applied Physics Letters 88, 123109 (2006).*
Zhang et al., Transparent, Conductive, and Flexible Carbon Nanotube Films and Their Application in Organic Light-Emitting Diodes, 2006, Nano Letters, vol. 6, No. 9, pp. 1880-1886.*
Wu et al, Transparent, Conductive Carbon Nanotube Films, Aug. 27, 2004, Science, col. 305, pp. 1273-1276.*
International Search Report and Written Opinion mailed Sep. 9, 2010 in corresponding International Application No. PCT/FI2010/050378 filed May 11, 2010 including International Search Report (4 pages) and Written Opinion (9 pages).
Japanese Office Action for Application No. 2012-509071, dated Nov. 15, 2012.
Office Action for Chinese Application No. 201080023274.2 dated Feb. 17, 2013.
Béguin, F.; "*Application of Nanotextured Carbons for Electrochemical Energy Storage in Aqueous Medium;*" Journal of the Brazilian Chemical Society, vol. 17, No. 6; pp. 1083-1089; dated 2006.
Béguin, F., et al.; "*Nanotextured Carbons for Electrochemical Energy Storage;*" Nanomaterials Handbook, Chapter 26; p. 713-737; dated 2006.
Kaempgen, M., et al.; "*Bifunctional carbon nanotube networks for supercapacitors;*" Applied Physics Letters, vol. 90; 264104; dated 2007.
Liu, C. G., et al.; "*Single-walled carbon nanotubes modified by electrochemical treatment for application in electrochemical capacitors;*" Journal of Power Sources, vol. 160; pp. 758-761; dated 2006.
Pasquier, A. D., et al.; "*Conduction and transparent single-wall carbon nanotube electrodes for polymer-fullerene solar cells;*" Applied Physics Letters, vol. 87; 203511; dated 2005.
Suga, T., et al.; "*Photocrosslinked nitroxide polymer cathode-active materials for application in an organic-based paper battery;*" Chemical Communications; pp. 1730-1732; dated 2007.
Sugimoto, W., et al.; "*Fabrication of Thin-Film, Flexible, and Transparent Electrodes Composed of Ruthenic Acid Nanosheets by Electrophoretic Deposition and Application to Electrochemical Capacitors;*" Journal of Electrochemical Society, vol. 153, No. 2; pp. A255-A260; dated 2006.
Office Action for Japanese Application No. 2012/509071; dated Jan. 30, 2014.
Chinese Office Action for Application No. 201080023274.2, dated Oct. 23, 2013.

* cited by examiner

NANO-STRUCTURED FLEXIBLE ELECTRODES, AND ENERGY STORAGE DEVICES USING THE SAME

DISCLOSURE OF JOINT RESEARCH AGREEMENT

The claimed invention was made under a joint research agreement between Nokia Corporation, Finland, and University of Cambridge, United Kingdom. The joint research agreement was in effect before the date the claimed invention was made, and the claimed invention was made as a result of activities undertaken within the scope of the joint research agreement.

TECHNICAL FIELD

This disclosure relates to energy storage units. Such energy storage units can be used in portable electronic devices, photovoltaic systems, etc. In particular, this disclosure relates to energy storage units having nanostructured materials as functional components.

BACKGROUND ART

The ever-increasing demand for portable electronic devices motivates technological improvements in energy conversion and storage units used in these devices. In developing the energy conversion and storage units (examples of which include batteries, capacitors and hybrid battery-capacitors), lightweight construction, long lifetime, high energy density, high power density and flexibility to meet various design and power consumption needs are important factors to consider. High power density is needed in providing fast bursts of current in power demanding applications such as camera flashlights, hard disk drives, high-resolution displays, etc. Electrochemical double layer capacitors (EDLCs), also known as supercapacitors, are very attractive power sources for those energy-hungry electronic devices. Supercapacitors are generally lightweight, having high power density and long durability. Since conventional batteries cannot provide for peaks of power required for high power density applications without getting too big in size, having a supercapacitor working alongside a battery in an electronic device would be an ideal solution. The supercapacitor-battery combination can provide the power boost the device needs while keeping battery dimensions small and extending battery lifetime.

Capacitor electrodes are commonly fabricated using various forms of carbon. Carbon has relatively high conductivity, light weight and high chemical stability under acidic and alkaline conditions, making it an ideal candidate for storing electrical charges. In supercapacitors, the surface area of the electrodes is of critical importance. Porous carbon structures having a high surface area, such as activated carbon, are commonly used. Recently, for further enhancing the surface area, various forms of nanostructured carbon are being used.

Future portable device concepts envisage devices that are flexible and/or transparent. One notable example is the so-called "Morph" concept developed by Nokia Corporation. In this concept, portable electrical devices are envisioned to be flexible and transparent, so that they blend more seamlessly with the way people live. Transparent and flexible electronic devices offer an entirely new aesthetic dimension. Furthermore, solar absorption capability may be built in, that charges the device, whilst batteries become smaller, longer lasting and faster to charge. The integrated electronics shown in the Morph concept could cost less and include more functionality in a much smaller space, even as interfaces are simplified and usability is enhanced. All of these new capabilities will unleash new applications and services that will allow people to communicate and interact in unprecedented ways.

An integral but yet unexplored part of such a flexible device is transparent power storage units. Such power storage units should meet both the power requirements and design requirements of the portable electronic devices. Also, it is very important that the flexible and transparent power storage units are made with simple and low cost processes.

SUMMARY OF THE INVENTION

In a first aspect of the invention, a device is provided. The device comprises a first conductive sheet, a second conductive sheet being parallel to the first conductive sheet, and a sheet of a substance placed between the first conductive sheet and the second conductive sheet. At least one of the first conductive sheet and the second conductive sheet comprises a film. The film is composed of carbon nanoparticles. The carbon nanoparticles are arranged to be adjacent to the sheet of the substance. The sheet of the substance comprises a sheet of a porous insulating film imbibing an ionic solution. The first conductive sheet, the second conductive sheet and the sheet of the substance are at least partially transparent.

In the above device, the first conductive sheet, the sheet of the substance and the second conductive sheet form a multi-layered stack. The device may further comprise a first insulating sheet and a second insulating sheet disposed on outer surfaces of the multi-layered stack, respectively.

The device may be an electrical energy storage unit. The first and the second conductive sheets may be arranged to be connectable with respective terminals of an external electrical energy source or drain.

In the above device, the film may be disposed on a transparent substrate. The transparent substrate may be a flexible transparent substrate. The flexible transparent substrate may be made of polyethylene terephalate or polyimide.

The film may be fabricated by a process that comprises filtrating a suspension of the carbon nanoparticles through a filter to form a carbon nanoparticle layer on a surface of the filter, disposing the substrate on the carbon nanoparticle layer in an elevated temperature, and dissolving the filter.

In the device, the carbon nanoparticles may comprise high aspect ratio carbon naonparticles. The high aspect ratio carbon naonparticles may comprise carbon nanotubes, carbon nanofibers or a mixture of carbon nanotubes and carbon nanofibers. The carbon nanotubes may comprise single walled carbon nanotubes.

Alternatively in the device, the carbon nanoparticles may comprise both high aspect ratio carbon nanoparticles and low aspect ratio carbon nanoparticles. The high aspect ratio carbon naonparticles may comprise carbon nanotubes, carbon nanofibers or a mixture of carbon nanotubes and carbon nanofibers; the low aspect ratio carbon nanoparticles may comprise carbon nanohorns, carbon nano-onions, or a mixture of carbon nanohorns and nano-onions.

Alternatively, the film may be fabricated by a process that comprises filtrating a suspension of the high aspect ratio carbon nanoparticles through a filter to form a high aspect ratio carbon nanoparticle layer on a surface of the filter, disposing the substrate on the high aspect ratio carbon nanoparticle layer in an elevated temperature, dissolving the filter, and disposing low aspect ratio carbon nanoparticles on the layer of the high aspect ratio carbon nanoparticles.

In a second aspect of the invention, a process for forming a carbon nanoparticle structure is provided. The process comprises filtrating a suspension of carbon nanoparticles through a filter to form a layer of the carbon nanoparticles on a surface of the filter, disposing a substrate on the carbon nanoparticle layer in an elevated temperature, and dissolving the filter.

In the process, the carbon nanoparticles may comprise high aspect ratio carbon naonparticles. The high aspect ratio carbon nanoparticles may comprise carbon nanotubes, carbon nanofibers or a mixture of carbon nanotubes and carbon nanofibers. The carbon nanotubes may comprise single walled carbon nanotubes.

Alternatively the process may comprise filtrating a suspension of high aspect ratio carbon nanoparticles through a filter to form a layer of the high aspect ratio carbon nanoparticles on a surface of the filter, disposing a substrate on the high aspect carbon nanoparticle layer in an elevated temperature, dissolving the filter and disposing low aspect ratio carbon nanoparticles on the layer of the high aspect ratio carbon nanoparticles.

The high aspect ratio carbon naonparticles may comprise carbon nanotubes, carbon nanofibers or a mixture of carbon nanotubes and carbon nanofibers; the low aspect ratio carbon nanoparticles may comprise carbon nanohorns, carbon nano-onions, or a mixture of carbon nanohorns and carbon nano-onions.

In the process above, the substrate may be a transparent film. The transparent film may be a polyethylene terephalate film or a polyimide film.

In the process, the suspension of carbon nanoparticles may contain carbon nanoparticles suspended in an aqueous solution of a dispersant. The dispersant is one or more of the following: sodium dodecyl sulfate, sodium dodecyl benzenesulfonate, polyethylene glycol p-(1,1,3,3-tetramethylbutyl-phenyl ether or its derivative, cetyltrimethylammonium bromide or its derivative, and N-methyl-2-pyrrolidone or its derivative.

In the process, filtrating the suspension of the carbon nanoparticles may be performed in vacuum atmosphere.

BRIEF DESCRIPTION OF THE DRAWINGS

The features and advantages of the invention described herein will become apparent from a consideration of the subsequent detailed description presented in connection with accompanying drawings, in which.

DETAILED DESCRIPTION

This disclosure relates to a thin, lightweight, flexible and even transparent energy storage unit. The key component of the energy storage unit is a pair of electrodes that are capable of storing large amounts of electrical charges and releasing the charges rapidly to create a power burst. According to the present invention, at least one, and preferably both, of the electrodes are made with a nanostructured material. Among suitable nanostructured materials, carbon nanoparticles are preferred. Carbon nanoparticles include high aspect ratio carbon nanoparticles and low aspect ratio carbon nanoparticles. Examples of the high aspect ratio carbon nanoparticles include carbon nanofibers (CNFs) and carbon nanotubes (CNT). Examples of the low aspect ratio carbon nanoparticles include carbon nanohorns (CNHs), fullerenes (C60) and carbon nano-onions (CNOs). CNTs are relatively easy to synthesize, and they are commonly used. CNTs include single walled CNT (SWCNT) and multi walled CNT (MWCNT). SWCNTs are especially preferred due to their superb electrical properties.

For use as the electrodes, the nanomaterials are preferably in a thin film form. The nanomaterial thin film may be freestanding or being deposited on a substrate. In the following, processes for making nanostructured thin film electrodes and for making energy storage units comprising the nanostructured thin film electrodes are explained through exemplary embodiments. It is understood that the scope of the present invention is not limited by these particular examples.

First Embodiment of the Invention

A transparent energy storage device structure (e.g. a supercapacitor) is fabricated according to a process described below. The device structure comprises a pair of transparent electrodes and a transparent separator. At least one, and preferably both, of the electrodes comprises a layer of carbon nanostructured film. One example of the carbon nanostructured film is a film composed of CNTs.

Particle-form CNTs (i.e. a loose powder) can be prepared by various synthesis methods known in the art. The CNT nanoparticles, preferably in the form of SWCNT nanoparticles, are mixed with a dispersant solution to form an aqueous suspension. One exemplary composition of the suspension is that it contains 2 mg/L of CNT powder in 1% aqueous solution of sodium dodecyl sulfate (SDS). Other suitable dispersants include various nonionic surfactants such as sodium dodecyl benzenesulfonate (SDBS), polyethylene glycol p-(1,1,3,3-tetramethylbutyl)-phenyl ether (Trade name TritonX), cetyltrimethylammonium bromide (CTAB) etc., and organic solvents in which CNTs readily disperse, such as N-methyl-2-pyrrolidone (NMP).

Figure 1:
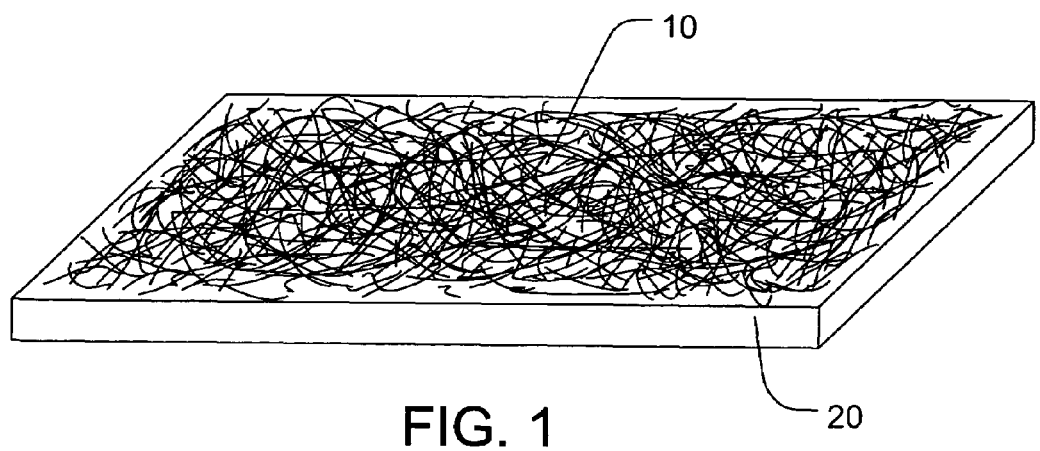
FIG. 1 is a schematic illustration of a layer of high aspect ratio carbon nanoparticles deposited on a substrate.

A certain amount of the above-described CNT suspension is filtrated through a filter membrane using a filter flask and in a vacuum environment. One example of the filter membrane is a MCE nitrocellulose filter, pore size 220 nm. The CNTs remain on the filter membrane to form an entangled network, resembling a porous thin film. Then, the CNT film is washed for removing the surfactants. After that, the CNT film is transferred onto a transparent substrate at an elevated temperature (e.g. 80° C.). Subsequently, the filter membrane is etched away in a bath of a suitable solvent. As shown schematically in FIG. 1, the resulting CNT film 10 is uniformly deposited on the substrate 20. The CNT film on the substrate will be used as an electrode for a supercapacitor.

Materials suitable for the transparent substrate include various organic materials such as polyethylene terephthalate (PET), or inorganic materials such as glass or quartz. A flexible and transparent substrate is preferred, as is the case of PET. It has been found that electrical properties of the flexible "CNT on PET" films do not easily degrade with flexing. Besides PET, many other flexible and transparent polymer films can also be used, examples of which include KAPTON polyimide films, etc.

Figure 2:
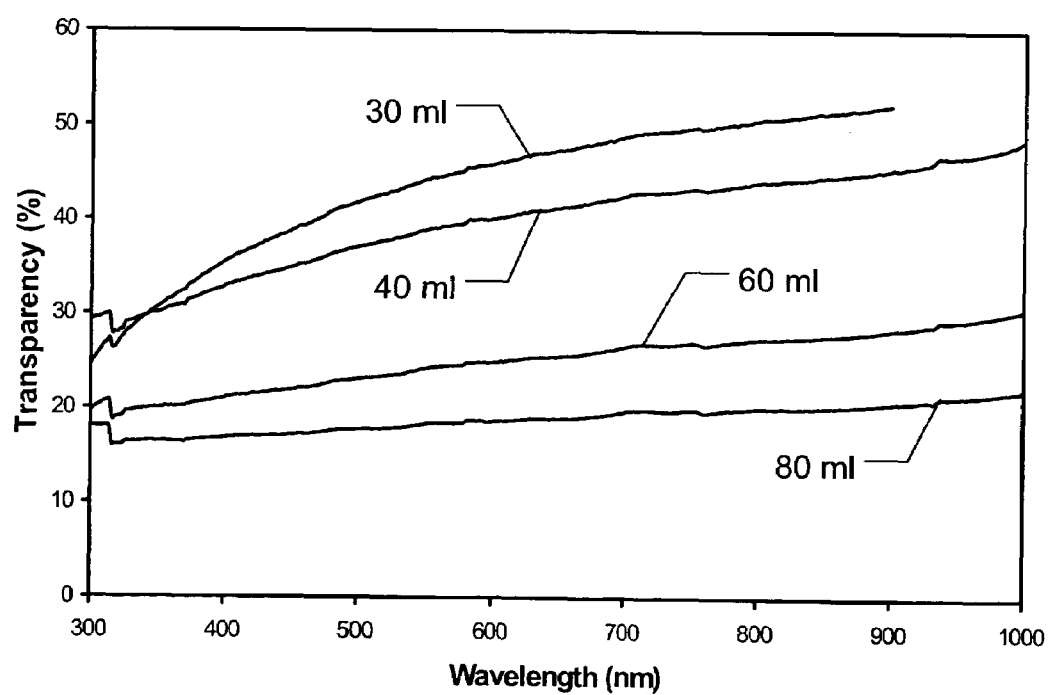
FIG. 2 is a transparency data plot at visible light wavelengths for carbon nanotube (CNT) film samples with different CNT densities.

Transparency and conductivity of the CNT film electrode may vary depending on the density of the CNTs on the substrate (i.e. number of CNTs on a unit area of the substrate). Generally speaking, the density of the CNTs is proportional to the volume of the aqueous suspension that has been filtrated through the filter and to the concentration of CNTs. FIG. 2 shows measured transparency data on CNT film samples made with different amounts of filtered solution (30 ml, 40 ml, 60 ml and 80 ml, respectively). The transparency is measured from a single CNT film on a glass slide. The filter material and the composition of the suspension are described above.

Figure 3:
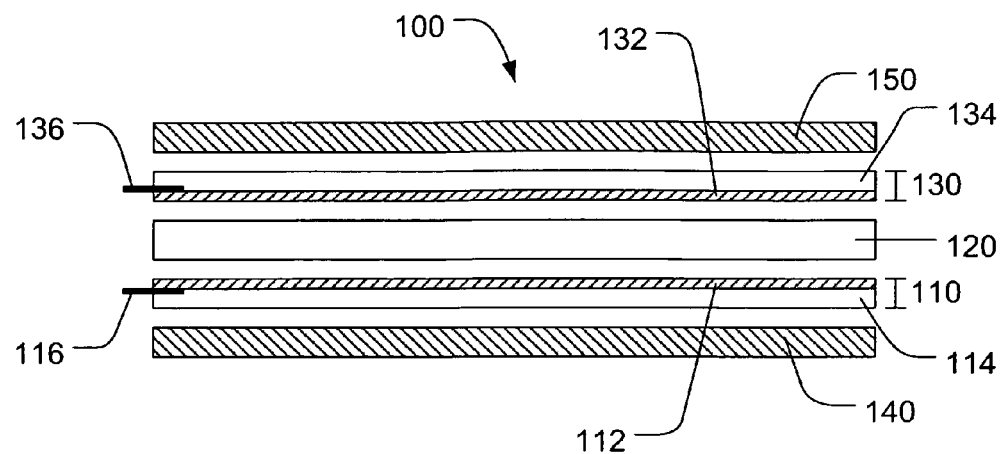
FIG. 3 is a schematic illustration of an energy storage device structure according to the invention.

Referring now to FIG. 3, a basic structure of a multi-layered thin film energy storage unit 100 comprises a first conductive sheet 110, a sheet containing an ionic solution (i.e. an electrolyte) 120 disposed on the first sheet 110, and a second conductive sheet 130 of same or different material disposed on the sheet containing the electrolyte 120. The first sheet 110, the sheet containing the electrolyte 120 and the second sheet 130 form a basic multi-layered device structure. The first sheet 110 and/or the second sheet 130 may comprise more than one layer. For example, the first sheet 110 may comprise a conductive layer 112 and a base layer 114, and the second layer 130 may comprise a conductive layer 132 and a base layer 134. At least one (and preferably both) of the conductive layers 112 and 132 are the above-described CNT film layer. The CNT film layers 112 and/or 132 are/is arranged to be adjacent to the electrolyte-containing sheet 120, respectively.

The sheet containing the electrolyte 120 comprises a porous non-conductive film (called separator) that is soaked (i.e. imbibed) with an electrolyte solution. Transparent polymer membranes such as Nafion® or Parylene may be used as the separator, but any other suitable separator materials may also be used. Examples of the electrolyte solution include 1M sulphuric acid and 1M potassium hydroxide, but any other suitable electrolytes can also be used. When connected to an external DC power source, the free ions in the electrolyte migrate to the CNT films according to the direction of the applied external electrical filed. The CNT films 112 and 132 are capable of storing a large amount of free ions, owing to their extremely high surface areas.

Contacts to external circuits can be made on the CNT films (as shown schematically in FIG. 3, elements 116 and 136, for example) by sputtering/evaporation of a suitable metal such as palladium, by casting silver paste, or by any other suitable methods. The device structure 100 may further comprise protective sheets 140 and 150, disposed on outer surfaces of the basic multi-layered device stack (sheets 110, 120 and 130), respectively. Even further, the device 100 may be hermetically sealed.

In order for the device 100 to be transparent, all the sheets of the device must be transparent. In order for the device 100 to be flexible, all the sheets must be flexible. For example, base layers 114 and 134 may be made with the transparent and flexible materials as mentioned above. If only transparency is required, other transparent but less flexible materials can also be considered.

Figure 4:
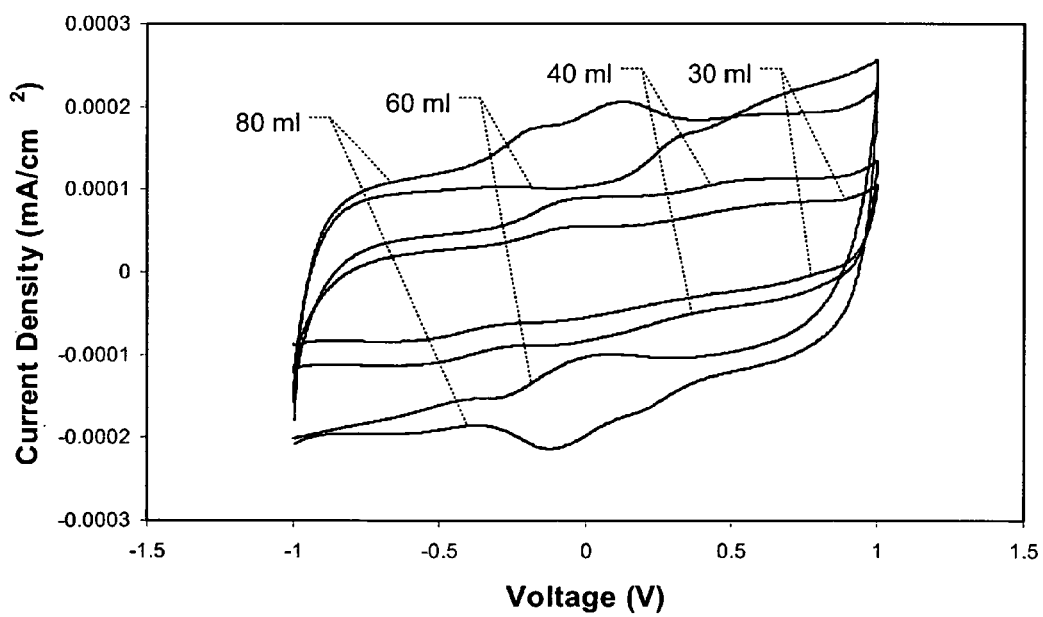
FIG. 4 is a cyclic voltammetry data plot of capacitors comprising CNT films with different CNT densities.

Performance of the CNT electrodes in the supercapacitor can be measured by a so-called cyclic voltammetry (CV) measurement. In the CV measurement, a voltage source is connected between the CNT electrodes, and the potential between the electrodes is ramped linearly versus time so that the capacitor is charged, until the potential reaches a set point. Then, the potential ramp is inverted, causing the capacitor to discharge. The intensity of the charge and discharge current density is plotted versus the applied voltage to give a cyclic voltammogram trace as current density ($mA/cm^2$) vs. potential (V). Simply speaking, the difference of the charging (top) curve, and discharging (bottom) curve on the y-axis, i.e. the width of the voltammogram trace, is proportional to the electrodes' ability to store charges. This means that the wider the curve, the more charge can be stored by the electrodes, and hence the higher the capacitance. FIG. 4 shows CV data of various CNT electrodes with different CNT densities as measured by the amount of solutions filtered (30 ml, 40 ml, 60 ml and 80 ml, respectively), according to the above-described procedure.

While the capacitance of the CNT film electrode increases with the density of the CNT film, the transparency of the electrode decreases with the CNT density. Therefore, a balance between the optical transparency and the electrical charge storage capacity needs to be determined. Still remarkably though, even with the lowest dispersions (30-40 ml), the CNT film's functionality as a capacitor electrode is found to be excellent. The transparency range and the electrical properties of these electrodes make them well suited for advanced user interface technologies (such as display and camera applications).

Second Embodiment of the Invention

Based on the above described electrode structure, the charge storing capacity of the nanostructured film can be further enhanced by intermixing the high aspect ratio CNTs with low aspect ratio carbon nanoparticles. One example of the low aspect ratio carbon nanoparticle is the single walled carbon nanohorn (SWCNH). SWCNHs are nano-crystal particles structured from cone-shaped hollow carbon (with graphene surface) crystallites about two to three nanometers long. These crystallites aggregate to form a dahlia-, or bud-like nanoparticle structure about 50 to 100 nanometers in diameter and spherical or near spherical in overall shape, with nanocones on the surface. Another example of the low aspect ratio carbon nanoparticle is carbon nano-onion (CNO). CNOs are ball-shaped crystallite (fullerenes) with one carbon ball enclosing another carbon ball. CNHs and CNOs may be synthesized using various methods. Two commonly used methods are: (1) laser ablation of graphite bar in inert-gas-atmosphere chamber; or (2) submerged arc-discharge method, where high voltage is introduced to a metal or graphite bar, which is brought close to a graphite bar in a liquid. In the example described below, carbon nanoparticles are synthesized using the submerged arc-discharge method, which is especially suitable for large scale and economical productions of the carbon nanoparticles.

Briefly speaking, for the submerged arc process, a DC arc discharge is generated between two graphite electrodes submerged in a container filled with a larger quantity of a liquid (for example, ~2000 $cm^3$ of liquid nitrogen or deionized water in a stainless steel Dewar or a glass beaker).

Liquid nitrogen is used for producing CNHs while deionized water is used for producing CNOs. For producing the CNHs, the arc discharge was initiated in the liquid nitrogen by touching a 99.99% purity graphite anode (3 mm in diameter) with a graphite cathode (12 mm tip diameter) of similar purity. The arc voltage and current were typically 34 V and 50 A, respectively, but may be adjusted for achieving optimum production rate. The gap between the electrodes was kept constant at around 1 mm by continuously translating the anode during the experiment in order to maintain a stable discharge. The arc discharge in liquid nitrogen is turbulent, and a dense black smoke is observed near the discharge region. The evaporation rate of liquid nitrogen was about 200 $cm^3$/min and the anode consumption rate was about 375.3 mg/min. In contrast to the discharge in water, the products from the arc discharge in liquid nitrogen settle exclusively at the bottom of the liquid container. The resulted product is an aggregated mixture of several kinds of carbon nanoparticles, including multi-walled carbon nanotubes (MWCNTs), amorphous carbon and single walled carbon nanohorns (SWCNH). CNHs are then separated from the aggregate. One method for separating the CNHs is to introduce the aggregate into deionized water so that CNHs float on the water while other particles sink. The average diameter of the CNH particles is in the range of 20 to 100 nm.

The carbon nanostructured films are prepared by a procedure similar as that described in the first embodiment of the invention. The difference is that the carbon nanostructured thin film deposited on the substrate comprises at least two kinds of carbon nanoparticles, one being high aspect ratio carbon nanoparticles such as SWCNT and another being low aspect ratio carbon nanoparticles such as SWCNH. There are at least two ways for depositing the carbon nanoparticle mixture: one is to mix the CNHs with the CNTs in a suspension and filtrate the suspension on a membrane as described above, and another is to filtrate the CNT suspension first and then deposit the CNHs on the CNT layer by applying a CNH solution. CNH solution may be prepared by adding a certain amount of CNH powder in water and disperse the particles in an ultrasonic bath. Preferably, the CNH solution is applied after the CNT film has been transferred to the substrate.

Figure 5:
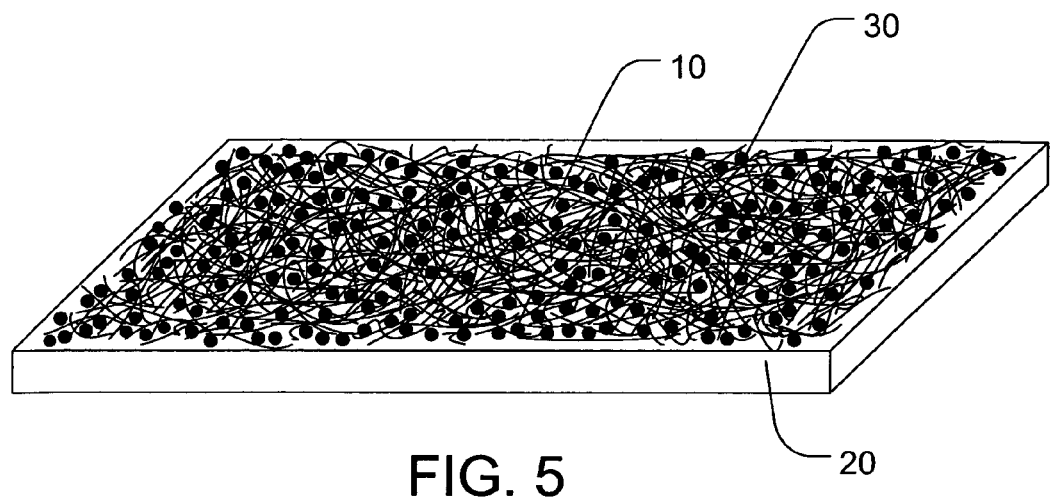
FIG. 5 is a schematic illustration of a combination of low aspect ratio carbon nanoparticles and high aspect ratio carbon nanoparticles deposited on a substrate.

As schematically illustrated in FIG. 5, the resulting carbon nanostructured film deposited on a substrate 20 comprises CNHs 30 intermixed with CNTs 10. Such a CNT/CNH nanostructured film is used as an electrode for a supercapacitor according to the device structure as shown in FIG. 3.

Figure 6:
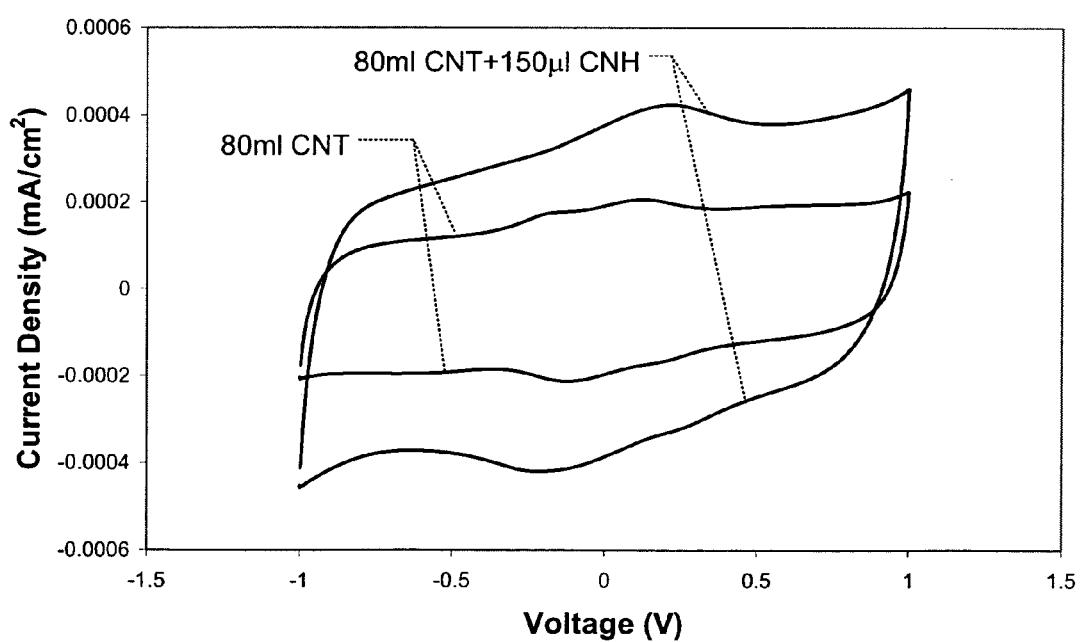
FIG. 6 is a cyclic voltammetry data plot comparing exemplary CNT film electrodes with exemplary CNT plus carbon nanohorn (CNH) film electrodes.

FIG. 6 shows cyclic voltagrams data plot comparing exemplary CNT film electrodes (80 ml CNT) with exemplary CNT+CNH film electrodes (80 ml CNT+150 µl CNH). It has been found that adding CNHs onto the CNT thin film can enhance the active surface area of the CNT film and increase the capacitance of the energy storage unit by about 100%.

It is believed that the ultra high surface area structure, as well as efficient charge transfer from the carbon nanohorns to the carbon nanotubes, account for this enhancement. Performance increase is achieved due to entangled morphology of low aspect ratio carbon nanoparticles and high aspect ratio nanoparticles that creates a high surface area, and also due to varying dipole moments at the surfaces of the electrodes.

Although CNH aggregates are larger in size as compared to the wavelength of visible light, a proper dispersion of CNHs on CNTs, both in quantity and in distribution, should maintain the transparency of the electrode. Therefore, with the CNT+CNH film electrodes, it is still possible to make the transparent energy storage unit. Same as in the first embodiment of the invention, flexible and transparent substrates are used in order for the device to be transparent and flexible. If only transparency is required, other transparent but less flexible materials can also be considered.

Third Embodiment of the Invention

If the transparency is not a concern, the energy storage unit of the present invention can be made with many kinds of flexible thin film substrates and flexible thin film electrolytes, and the energy storage device structure of FIG. 3 can be multiplied by stacking one on top of another.

Figure 7:
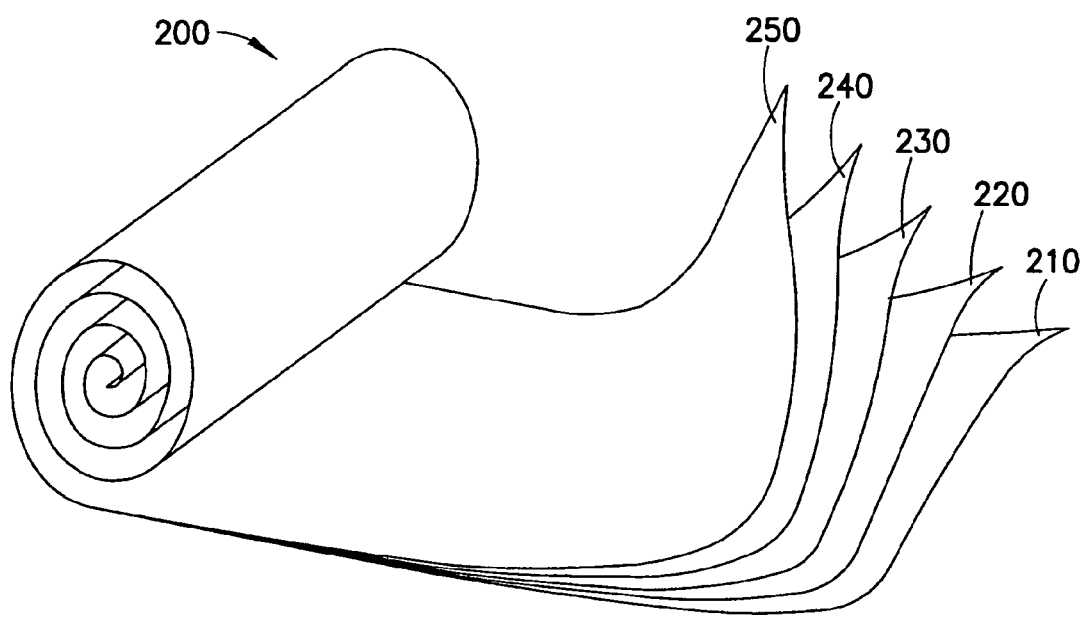
FIG. 7 is an example of a thin film supercapacitor core that is produced by rolling a multi layered thin film stack.

FIG. 7 shows a particular example of the multi-layered energy storage device structure 200, in which at least one of the layers is a layer of carbon nanostructured thin film on a flexible substrate. The structure 200 comprises a first sheet of an insulator 210, a first sheet 220 of a flexible substrate with a layer of the CNT+CNH thin film (according to the second embodiment of the invention) disposed thereon, a sheet of separator 230 integrated with a solid state electrolyte (as mentioned in the first embodiment of the invention), a second sheet 240 of a flexible substrate with a layer of CNT+CNH particles disposed thereon, and a second sheet of an insulator 250. The carbon nanostructured layers are arranged to be adjacent to the electrolyte layer.

The sheets 210-250 can have much larger width and length than their thickness. An industrialized process can be employed to stack these sheets together. The multi-layer stack 200, which then has much larger width and length than its thickness, can be folded to increase the overall thickness and decrease the overall length and width, or rolled into a cylindrical shape, for example. The folded or rolled device is then hermetically sealed. Preferably, the above fabrication process takes place in an inert gas environment that is oxygen-free (e.g. oxygen level not exceeding 5 ppm).

In summary, the present invention provides several advantages compared to applicable prior art processes. First, the components of the energy storage unit of the present invention can be made using relatively low cost materials and by easily scalable methods. Second, the transparent and flexible electrode structure provides for a fully transparent energy storage unit. Third, the unique composition of different types of carbon nanoparticles in the electrodes resulted in a significant performance enhancement of the energy storage unit.

It is to be understood that the above-described arrangements are only illustrative of the applications of the principles of the teachings hereof. In particular, it should be understood that although only a few examples have been shown, the teachings hereof are not restricted to those examples. Numerous modifications and alternative arrangements may be devised by those skilled in the art without departing from the scope of the present disclosure.

The invention claimed is:

1. A device, comprising:
a first conductive sheet,
a second conductive sheet being parallel to the first conductive sheet, and
a sheet of a substance placed between the first conductive sheet and the second conductive sheet;
wherein at least one of the first conductive sheet and the second conductive sheet comprises a film, said film being composed substantially of only carbon nanoparticles, said carbon nanoparticles being arranged to be adjacent to the sheet of the substance, said carbon nanoparticles comprising both carbon nanotubes and carbon nanohorns having varying dipole moments at a surface of the film, wherein the sheet of the substance comprises a sheet of a porous insulating film imbibing an ionic solution, and wherein the first conductive sheet, the second conductive sheet and the sheet of the substance are at least partially transparent.

2. The device of claim 1, wherein the first conductive sheet, the sheet of the substance and the second conductive sheet form a multi-layered stack, and the device further comprises a first insulating sheet and a second insulating sheet disposed on outer surfaces of the multi-layered stack, respectively.

3. The device of claim 2, wherein the device is an electrical energy storage unit, and the first and the second conductive sheets are arranged to be connectable with respective terminals of an external electrical energy source or drain.

4. The device of claim 1, wherein the film is disposed on a transparent substrate.

5. The device of claim 4, wherein the transparent substrate is a flexible transparent substrate.

6. The device of claim 5, wherein the flexible transparent substrate is made of polyethylene terephalate or polyimide.

7. The device of claim 4, wherein the film is prepared by a process that comprises:

filtrating said suspension of carbon nanoparticles through a filter to form a carbon nanoparticle layer on a surface of the filter, disposing the substrate on the carbon nanoparticle layer in an elevated temperature, and dissolving the filter.

8. The device of claim 7, wherein the process further comprises:

disposing high aspect ratio carbon nanoparticles including the carbon nanotubes in said carbon nanoparticle layer, and disposing low aspect ratio carbon nanoparticles including the carbon nanohorns on the layer of the high aspect ratio carbon nanoparticles.

9. The device of claim 1, wherein the film comprises a filtrate from a suspension of carbon nanoparticles, said filtrate comprising an entangled network of said high aspect ratio carbon nanoparticles including the carbon nanotubes and low aspect ratio carbon nanoparticles including the carbon nanohorns.

10. The device of claim 9, wherein the high aspect ratio carbon nanoparticles further comprise carbon nanofibers.

11. The device of claim 1, wherein the carbon nanotubes comprise single walled carbon nanotubes.

12. The device of claim 1, wherein the carbon nanoparticles of the film further comprise carbon nano-onions, wherein carbon nano-onions comprise ball-shaped crystallites.

13. The device of claim 1, wherein the carbon nanoparticles of the film have a ratio of carbon nanotubes to carbon nanohorns of at least 10 to 1.

* * * * *